US010021369B2

(12) United States Patent
Peeters et al.

(10) Patent No.: US 10,021,369 B2
(45) Date of Patent: Jul. 10, 2018

(54) IN-FLIGHT 3D INSPECTOR

(71) Applicant: Qcify Inc., San Mateo, CA (US)

(72) Inventors: Raf Peeters, San Mateo, CA (US); Bert Peelaers, Herentals (BE)

(73) Assignee: Qcify Inc., San Mateo, CA (US)

( * ) Notice: Subject to any disclaimer, the term of this patent is extended or adjusted under 35 U.S.C. 154(b) by 139 days.

(21) Appl. No.: 15/219,870

(22) Filed: Jul. 26, 2016

(65) Prior Publication Data

US 2018/0035098 A1    Feb. 1, 2018

(51) Int. Cl.
| H04N 5/77 | (2006.01) |
| H04N 13/02 | (2006.01) |
| H04N 5/225 | (2006.01) |
| G06T 7/00 | (2017.01) |

(52) U.S. Cl.
CPC ....... *H04N 13/0242* (2013.01); *G06T 7/0004* (2013.01); *H04N 5/2256* (2013.01); *G06T 2207/30128* (2013.01)

(58) Field of Classification Search
None
See application file for complete search history.

(56) References Cited

U.S. PATENT DOCUMENTS

| 2008/0129998 | A1* | 6/2008 | Johnson | G01N 21/64 356/338 |
| 2009/0210165 | A1* | 8/2009 | Christensen | B01J 19/0046 702/22 |
| 2015/0060700 | A1* | 3/2015 | Bjornson | B01L 3/0241 250/461.1 |
| 2016/0227741 | A1* | 8/2016 | Hsu | A01K 15/027 |
| 2017/0018088 | A1* | 1/2017 | Jeong | G06T 15/04 |
| 2017/0054950 | A1* | 2/2017 | Yeo | H04N 7/188 |
| 2017/0102288 | A1* | 4/2017 | Schell | G01M 11/31 |
| 2018/0065157 | A1† | 3/2018 | Anup | |

\* cited by examiner
† cited by third party

*Primary Examiner* — Eileen M Adams
(74) *Attorney, Agent, or Firm* — Imperium Patent Works LLP; Mark D. Marrello

(57) ABSTRACT

An in-flight 3D inspector includes a sample input funnel, a sample chute, a trigger, a plurality of cameras, a light source and storage device. A sample is placed in the sample input funnel and is caused to travel down the sample chute. The trigger is located on the sample chute and detects when the sample passes the trigger. In response to detecting the passing of the sample, the trigger outputs a trigger signal that indicates when the sample will pass through a focal plane on which all the plurality of cameras are focused. In response to the trigger signal, the sample is illuminated by the light source and the plurality of cameras capture an image of the sample as the sample passes through the focal plane. The captured images are stored on the storage device and used to generate a 3D image of the sample.

20 Claims, 12 Drawing Sheets

IN-FLIGHT 3D INSPECTOR FRONT PERSPECTIVE VIEW

IN-FLIGHT 3D INSPECTOR FRONT PERSPECTIVE VIEW

IN-FLIGHT 3D INSPECTOR REAR PERSPECTIVE VIEW

IN-FLIGHT 3D INSPECTOR RIGHT SIDE VIEW

IN-FLIGHT 3D INSPECTOR LEFT SIDE VIEW

SAMPLE TRAVEL PATH THROUGH IN-FLIGHT 3D INSPECTOR

DOUBLE STEREO CAMERA SYSTEM CONFIGURATION

IMAGE OF SAMPLE CAPTURED BY THE FIRST CAMERA

IMAGE OF SAMPLE CAPTURED BY THE SECOND CAMERA

IMAGE OF SAMPLE CAPTURED BY THE THIRD CAMERA

IMAGE OF SAMPLE CAPTURED BY THE FOURTH CAMERA

IN-FLIGHT 3D INSPECTOR WITH DEFECT PROCESSING FLOWCHART

IN-FLIGHT 3D INSPECTOR

TECHNICAL FIELD

The described embodiments relate generally to capturing multiple images of an object at a single moment while the object is in-flight, and more particularly to use the captured images to generate a three-dimensional image of the sample to aid in the detection of sample defects.

BACKGROUND INFORMATION

Detection of defects present on various objects such as tree nuts and tablets is currently performed by human inspection. A human inspector visually scans multiple objects and looks for defects in each of the objects viewed. The human inspector then generates a report as to the quality of the objects viewed. The quality report is used to grade the quality of the objects and determine the price of the objects. Human inspection takes a great amount of time and cost. Human inspection also results in inconsistent quality reports between different human inspectors. A faster, less expensive and more repeatable inspection solution is needed.

SUMMARY

In a first novel aspect, an in-flight 3D inspector includes a first camera and a second camera, a trigger, a light source, a storage device, a sample input funnel, a sample chute, a collector bin, and a computer system. The sample chute receives a sample from the sample input funnel and directs the sample toward a focal plane. The trigger detects the presence of a sample and generates a trigger signal. The first and second cameras are each focused on the focal plane and are adapted to capture an image in response to receiving a trigger signal. The light source is adapted to illuminate the sample when it travels through the focal plane. The in-flight 3D inspector is configured such that the sample is not in contact with any surface while traveling through the focal plane. A storage device adapted to store images captured by the first and second cameras. The collector bin is adapted to receive the sample after the sample travels through the focal plane. The computer system adapted to generate a three dimensional image of the sample based on the images captured by the first and second cameras.

In a second novel aspect, in a first step a sample is propelled toward a focal plane. In a second step, it is determined when the sample will travel through the focal plane. In a third step, the sample is illuminated as it travels through the focal plane. In a fourth step, two or more images of the sample are captured while the sample is traveling through the focal plane. Each image is captured from a different angle, and the sample is not in contact with any surface as the sample travels through the focal plane. In a fifth step, the two or more images are stored in a storage device. In a sixth step, a three dimensional image of the sample based on the two or more captured images is generated. In a seventh step, one or more characteristics of the sample are determined based on the three dimensional image.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to background examples and some embodiments of the invention, examples of which are illustrated in the accompanying drawings. In the description and claims below, relational terms such as "top", "down", "upper", "lower", "top", "bottom", "left" and "right" may be used to describe relative orientations between different parts of a structure being described, and it is to be understood that the overall structure being described can actually be oriented in any way in three-dimensional space.

Due to the drawbacks of human visual inspection, an automated inspector is needed to quickly, inexpensively and accurately detect defects present in objects such as tree nuts, tablets, screws and any many other types of objects. Some of the most important features of such an automatic inspector include: cost, number of objects inspected per minute, accuracy of defect detection, reliability of defect detection and ease of use with minimal user training.

Figure 1:
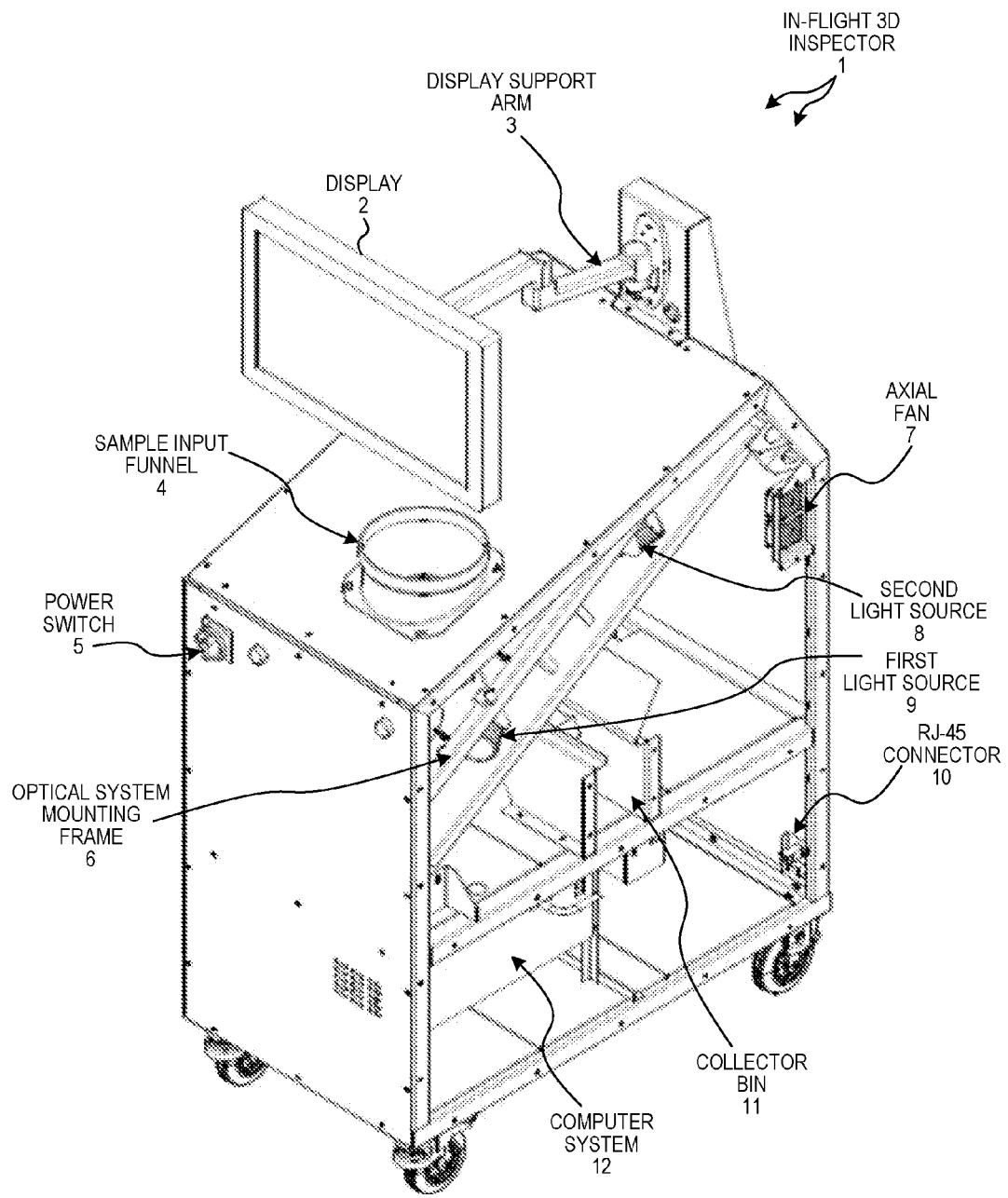
FIG. 1 is a first diagram of the in-flight 3D inspector 1 view from a first perspective.

FIG. 1 is a first diagram of the in-flight 3D inspector 1 view from a first perspective. The in-flight 3D inspector 1 includes a display 2, a display support arm 3, a sample input funnel 4, a power switch 5, an optical system mounting frame 6, an axial fan 7, a first light source 9, a second light source 8, an RJ-45 connector 10, a collector bin 11, and a computer system 12. The display 2 outputs information from the computer system 12 to a human user looking at the display. The display support arm 3 attaches the display 2 to the in-flight 3D inspector 1. In one example, the display support arm is adjustable with two hinges as shown in FIG. 1. In another example, the display support arm 3 is adjustable in additional dimensions (not shown in FIG. 1). The sample input funnel 4 is where samples are input to the in-flight 3D inspector. Power switch 5 is used by a human user to turn on (or off) the in-flight 3D inspector. The light sources are mounted to the optical system mounting frame 6. The axial fan 7 is used to create positive pressure in a camera enclosure (not shown in FIG. 1). In one example, the axial fan 7 is coupled to a first hose that directs air flow to a first camera enclosure and is coupled to a second hose that directs air flow to a second camera enclosure (not shown).

The hoses can be fixed or flexible hoses made of various materials including various plastics, fiberglass and metal materials. In this fashion, positive pressure in each camera enclosure is created. The positive pressure prevents debris from entering the camera enclosures and settling on any of the cameras. RJ-45 connector 10 is configured to receive an RJ-45 cable connected to a local network and electrically connect the RJ-45 cable to a network input port included on the computer system 12. The RJ-45 cable may be an ethernet cable (not shown). Via the RJ-45 connector 10 and a RJ-45 ethernet cable, the computer system 12 can connect to a local network or the public Internet. The computer system 12 may also include a wireless networking card (not shown) that allows computer system 12 to wirelessly communicate (i.e. WiFi or cellular connection) with a network without the need for a wired connection. The collector bin 11 is configured to collect samples that have completed their path through the in-flight 3D inspector.

Figure 2:
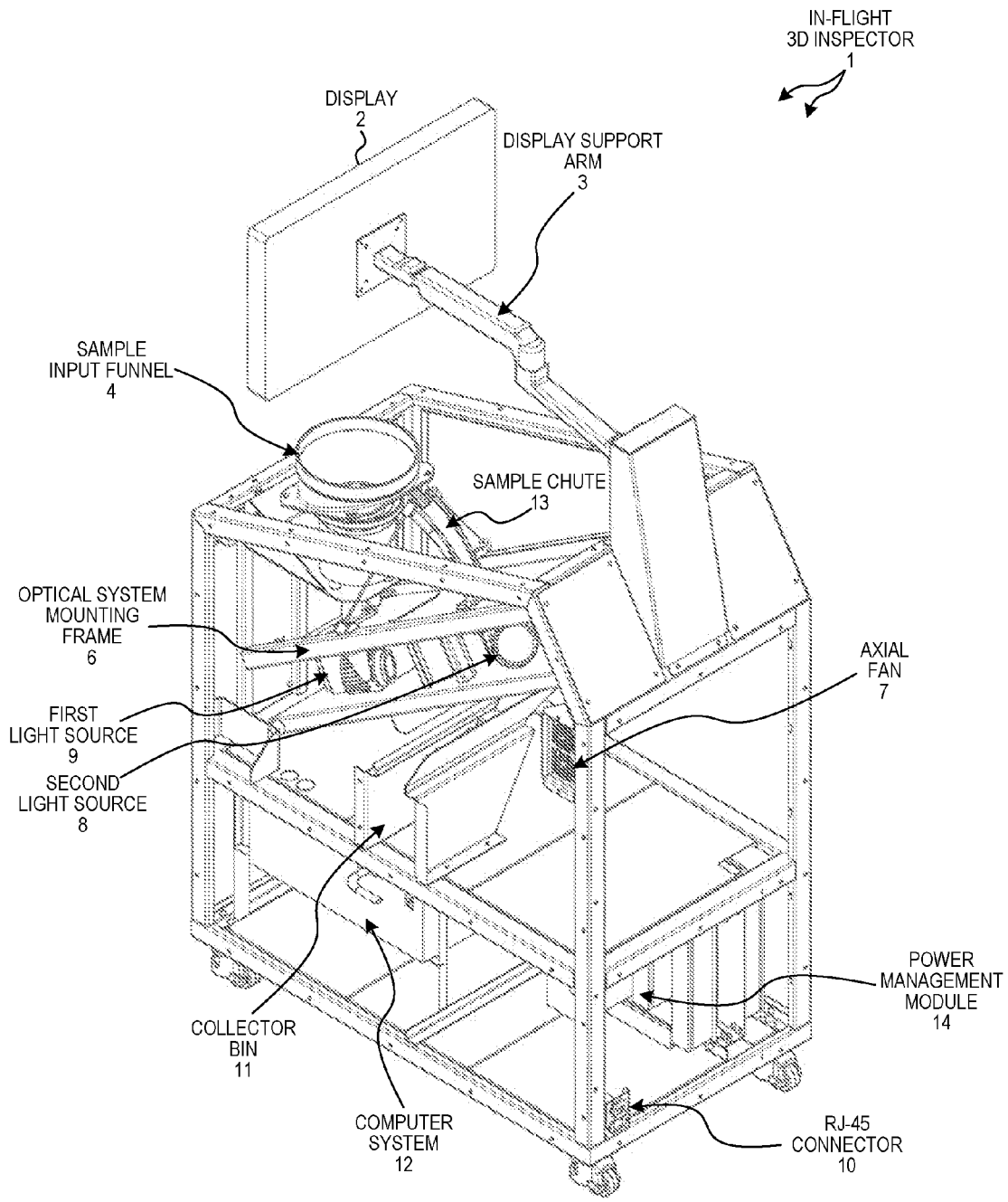
FIG. 2 is a second diagram of the in-flight 3D inspector 1 view from a second perspective.

FIG. 2 is a second diagram of the in-flight 3D inspector 1 view from a second perspective. FIG. 2 illustrates a sample chute 13 that is configured to guide a sample from the sample input funnel 4. The location of a power management module 14 is also shown in FIG. 14. The power management module 14 receives input power from the local power grid and generates power signals for the various electrical components operating within the in-flight 3D inspector 1. For example, the power management module 14 generates a power signal that is used to power the various light sources, the various cameras (not shown), the axial fan, the display and the computer system. In one example, the power management module 14 includes a battery which can be used to operate the in-flight 3D inspector when power from the local power grid is lost.

Figure 3:
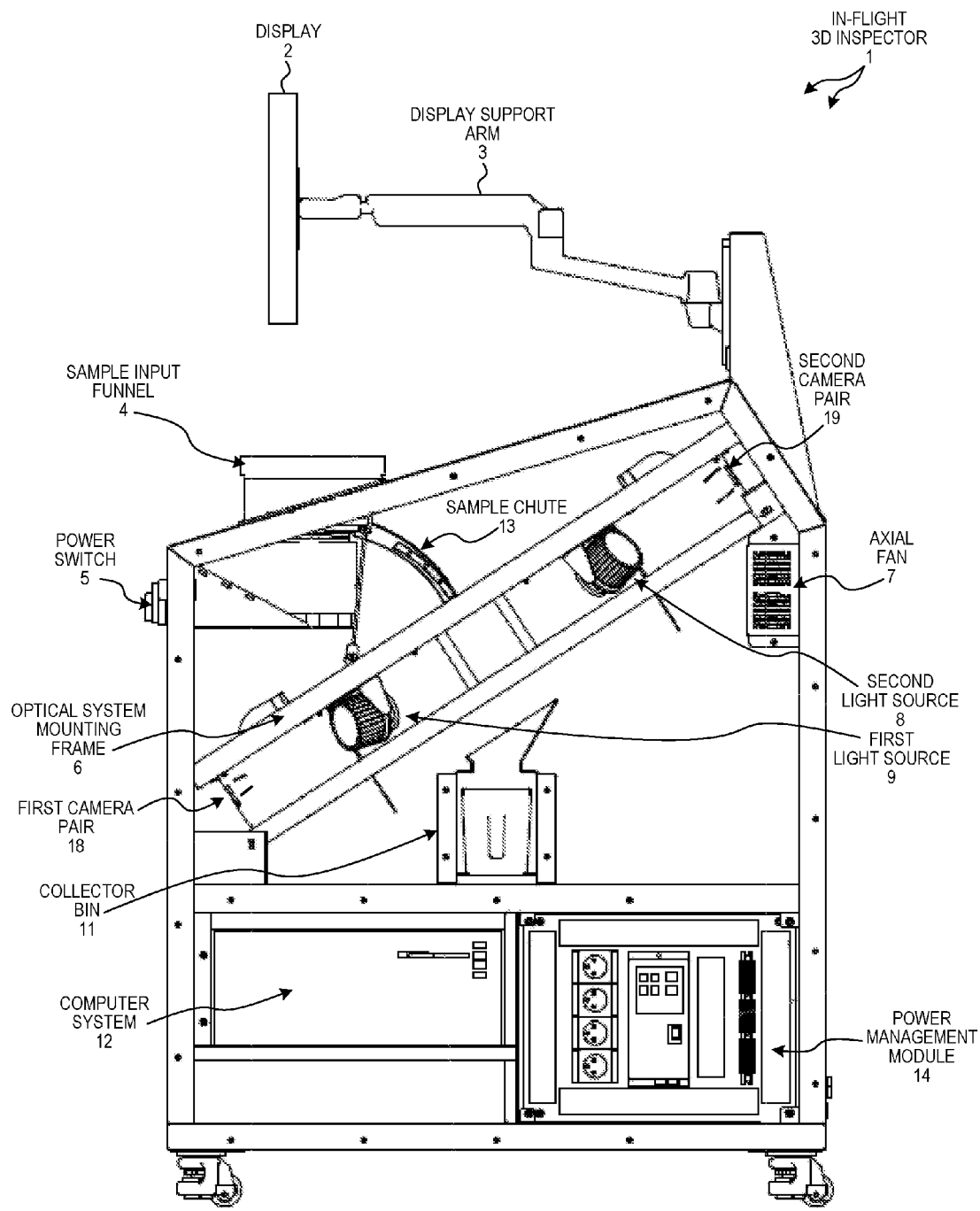
FIG. 3 is a third diagram of the in-flight 3D inspector 1 view from a right side view.
Figure 6:
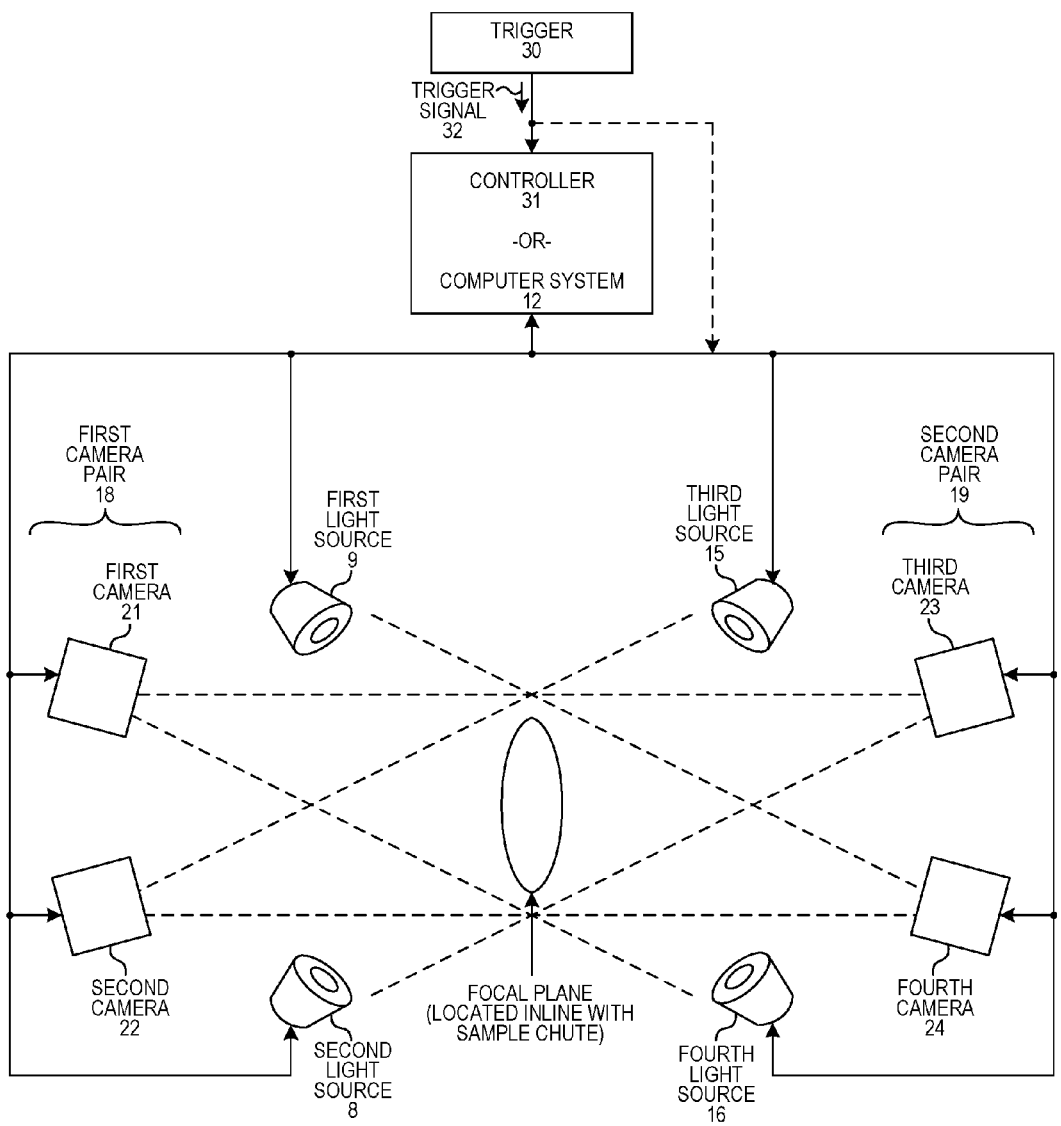
FIG. 6 is a diagram of a double stereo camera system configuration with triggering.

FIG. 3 is a third diagram of the in-flight 3D inspector 1 view from a right side view. FIG. 3 shows a first camera pair 18 and a second camera pair 19. FIG. 3 also illustrates that sample chute 13 is aligned with the midpoint between the first camera pair 18 and the second camera pair 19. The physical arrangement of the first camera pair 18 and the second camera pair 19 is illustrated in FIG. 6. FIG. 6 illustrates that the first camera pair 18 includes a first camera 21 and a second camera 22. The second camera pair 19 includes a third camera 23 and a fourth camera 24. All four cameras are focused on the same focal plane. The focal plane is located at the midpoint between the first camera pair 18 and the second camera pair 19. As discussed above regarding FIG. 3, the chute is also aligned with the midpoint between the first camera pair 18 and the second camera pair 19.

Camera Positioning

The four cameras are positioned such that each camera is focused on the focal plane. Each camera utilizes a lens to focus on the focal plane. In one example, wide angle lenses are used by each camera. One example of a wide angle lens is FL-BC1618-9M Ricoh lens. This wide angle lens has a format size of 1" format, a focal length of sixteen millimeters, a maximum aperture ratio of 1:1.8, an iris range of 1.8 to 16, and a resolution of nine mega-pixels. Other types of lenses may be used to achieve the necessary focus of each camera on the focal plane.

Figure 4:
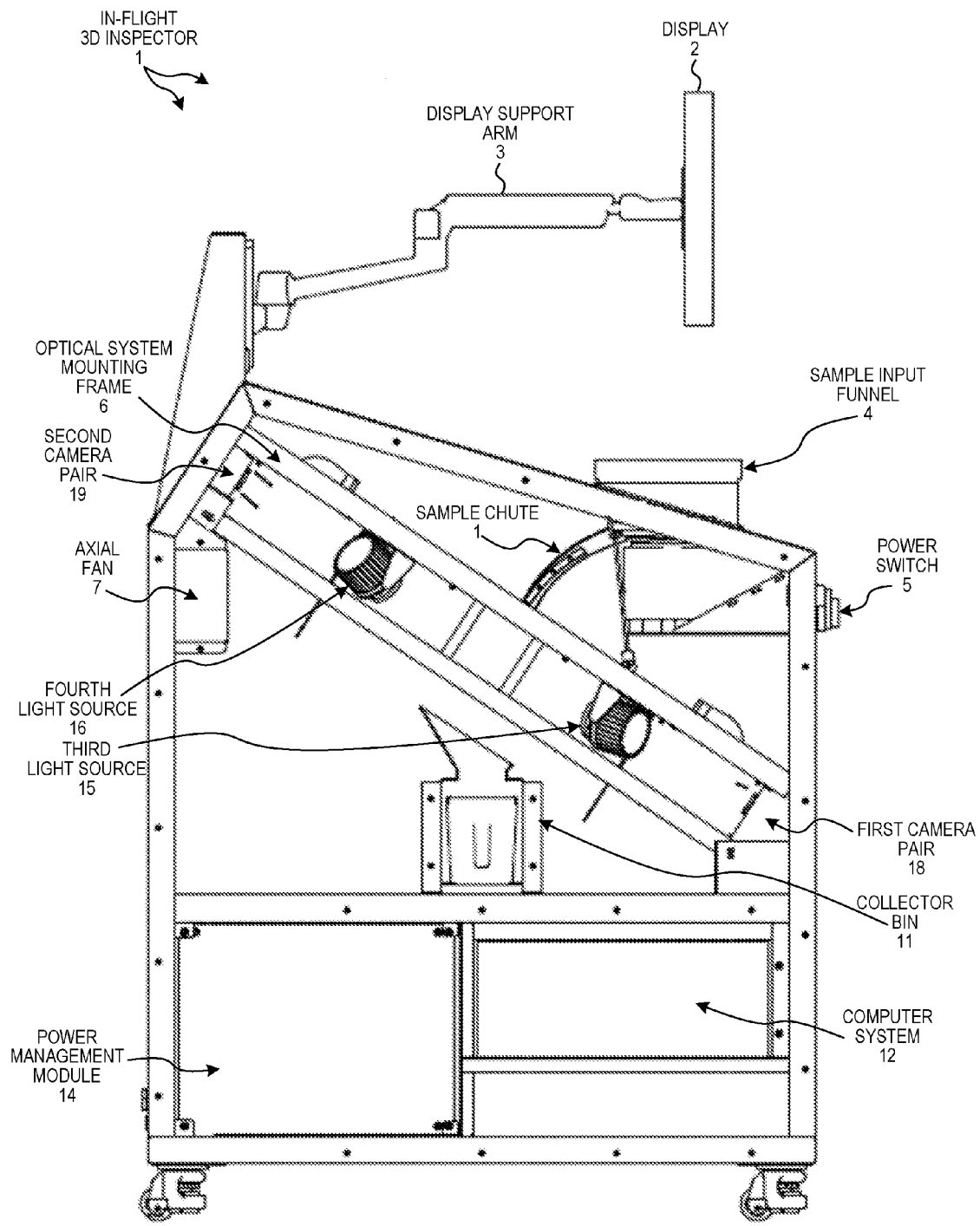
FIG. 4 is a fourth diagram of the in-flight 3D inspector 1 view from a left side view.

FIG. 4 is a fourth diagram of the in-flight 3D inspector 1 view from a left side view. FIG. 4 illustrates that a third light source 15 and a fourth light source 16 are also included in the in-flight 3D inspector 1. In one example, the first, second, third and fourth light sources are mounted to the optical system mounting frame 6. In another example, the light sources are mounted directly to outer frame of the in-flight 3D inspector 1 (not shown). After reading of the present disclosure, one skilled in the art will readily appreciate the various ways that light sources and cameras can be physically mounted within the in-flight 3D inspector 1.

Figure 5:
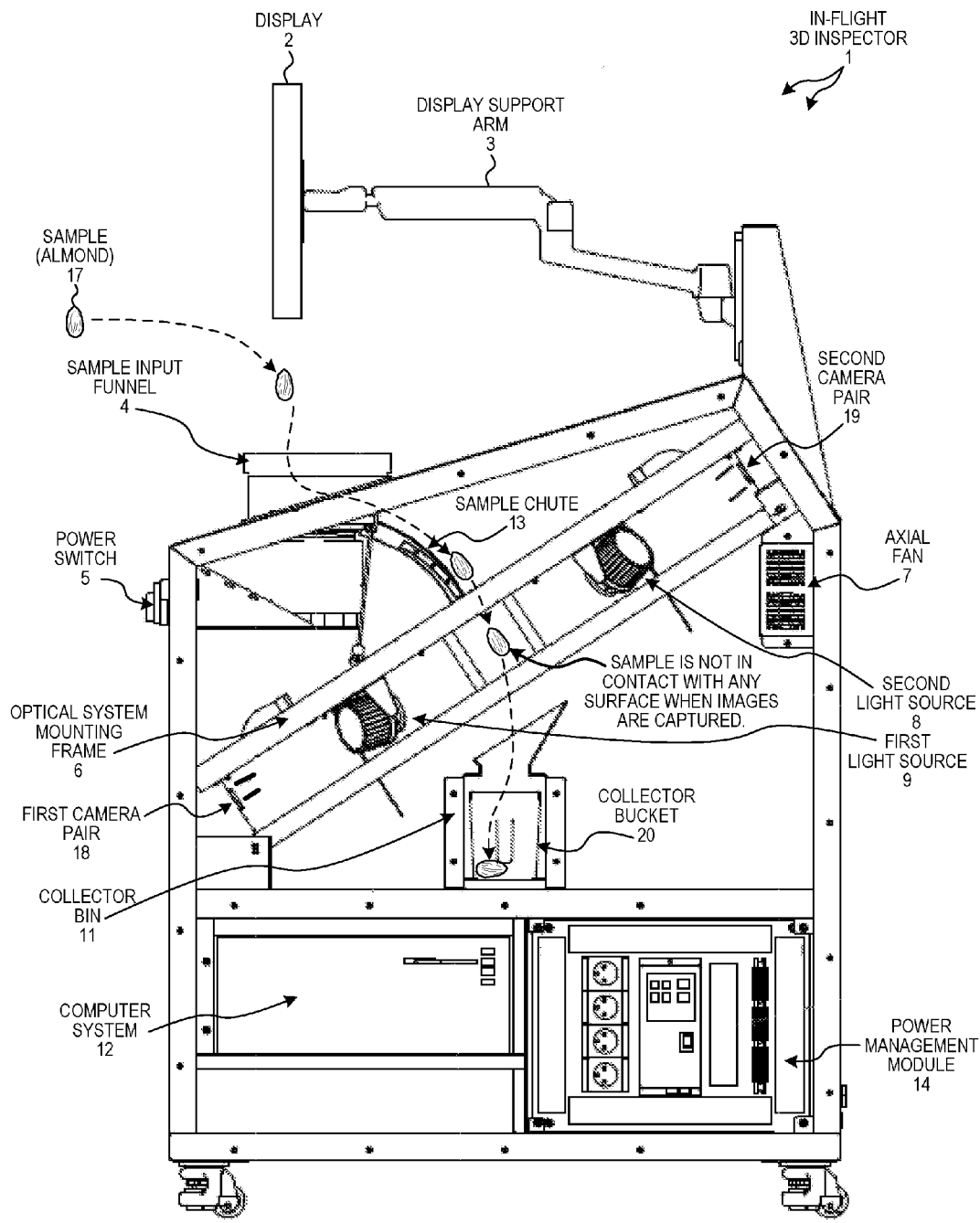
FIG. 5 is a diagram of the in-flight 3D inspector 1 illustrating the path a sample travels through the in-flight 3D inspector 1.

FIG. 5 is a diagram of the in-flight 3D inspector 1 illustrating the path a sample travels through the in-flight 3D inspector 1. First, a sample 17 is placed into the sample input funnel 4. The sample input funnel 4 directs the sample 17 to sample chute 13. In one example, the sample input funnel 4 is configured to vibrate such that sample 17 is directed toward sample chute 13. Sample chute 13 directs the sample 17 to a focal plane where the first camera pair 18 and the second camera pair 19 are both focused. In-flight 3D inspector 1 may be used to generate images of various types of samples, such as tree nuts, a peanuts, tablets, screws and washers.

Triggering System

Before the sample 17 reaches the focal plane, a trigger senses the presence of the sample 17 near the sample chute 13 and generates a trigger signal. In one example, the trigger is attached to the sample chute 13 and includes an optical transmitter and an optical receiver. In operation, the sample 17 interferes with the light traveling between the optical transmitter and the optical receiver as sample 17 travels along sample chute 13. This interference in received light is sensed by the optical receiver when the transmitted light does not irradiate the optical receiver. In response to detecting the interference in received light, the trigger generates a trigger signal. The trigger signal can be an electric signal that propagates along a conductor, or the trigger signal can be an electro-magnetic signal that propagates across free space to a receiving terminal. The duration between the time when the trigger signal is generated and the time when the sample 17 intersects the focal plane is based on where the trigger is located relative to the focal plane of the camera pairs. Once the trigger location is selected the duration between the time when the trigger signal is generated and the time when the sample 17 intersects the focal plane can be empirically measured or calculated. Once the duration between when the trigger signal is generated and the time when the sample 17 intersects the focal plane has been determined, the trigger signal can be used to determine the future time when the sample 17 will intersect the focal plane. This timing information can be used to properly control the various light sources and cameras in the in-flight 3D inspector.

The trigger is not shown in FIG. 5. However, a system diagram of the triggering system is illustrated in FIG. 6. FIG. 6 is a diagram of a double stereo camera system configuration with triggering. The triggering system includes trigger 30, controller 31 and/or computer system 12, cameras 21-24 and light sources 8-9 and 15-16. In one example, the trigger signal 32 (i) causes light sources 8, 9, 15, and 16 to turn on, and (ii) causes the first camera pair 18 and the camera pair 19 to capture an image when the sample 17 intersects in the focal plane. In another example, light sources 8, 9, 15 and 16 are already on and the trigger signal 32 only causes the first camera pair 18 and the camera pair 19 to capture an image when the sample 17 intersects in the focal plane.

In a first embodiment, the trigger signal is communicated from the trigger 30 to a controller 31 that controls when the first camera pair 18 and the second camera pair 19 capture images. In a second embodiment, the trigger signal 32 is communicated from the trigger 30 directly to the first camera pair 18 and the second camera pair 19 and causes the camera pairs 18 and 19 to capture images. In a third embodiment, the trigger signal 32 is communicated from the trigger 30 to computer system 12 that controls when the first camera pair 18 and the second camera pair 19 capture images.

In a fourth embodiment, the trigger signal is communicated from the trigger 30 to a controller 31 that controls when the light sources 8-9 and 15-16 are turned on. The controller 31 acts as a switch that connects an output power terminal of a power supply included in power management module 14 to a power input terminal of each light source 8-9 and 15-16. The controller switch turns ON the light sources in response to receiving the trigger signal. After the sample has passed though the focal plane, the controller turns OFF the light sources by disconnecting the output power terminal of the power supply from the power input terminal of each light source.

In a fifth embodiment, the trigger signal 32 is communicated from the trigger 30 directly to the light sources 8-9 and 15-16 and causes the light sources 8-9 and 15-16 to turn ON. In this embodiment, each light source 8-9 and 15-16 is configured to receive a power signal and an ON/OFF signal. The ON/OFF signal is controlled by the trigger signal. The light sources may include a timer circuit that is used to turn OFF the light sources after the sample has passed through the focal plane.

In a sixth embodiment, the trigger signal 32 is communicated from the trigger 30 to computer system 12 that controls when the light sources 8-9 and 15-16 are turn on. In this embodiment, each light source 8-9 and 15-16 is configured to receive a power signal and an ON/OFF signal. The ON/OFF signal is output by the computer system 12 in response to receiving the trigger signal from the trigger.

The light sources may be controlled such that the light sources turn on after the camera shutters are opened and turn off before the camera shutters are closed.

Controller 31 may be configured to communicate with computer system 12 via an RS232 communication link, an ethernet communication link, an Universal Serial Bus (USB) communication link, or any other available data communication links.

Figure 7:
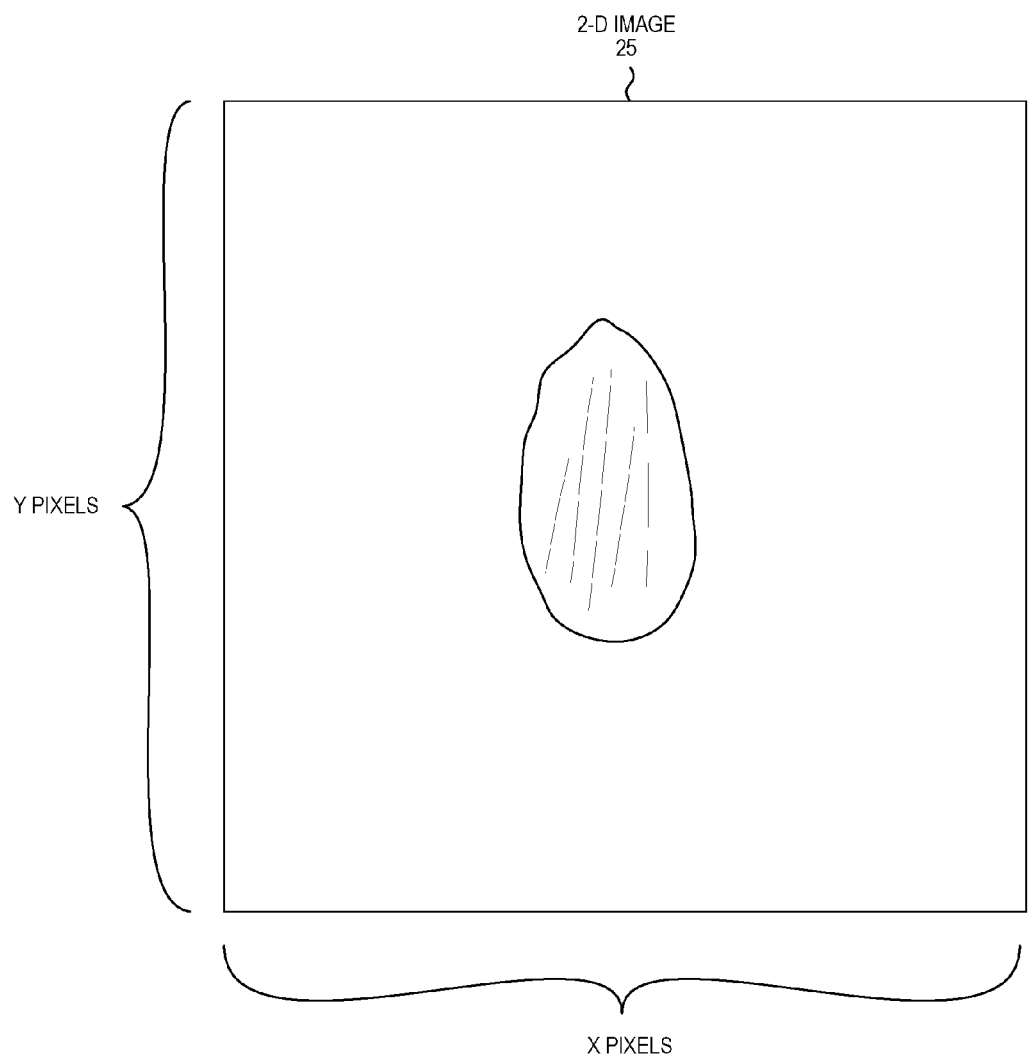
FIG. 7 is an image captured by a first camera of the double stereo camera system.
Figure 8:
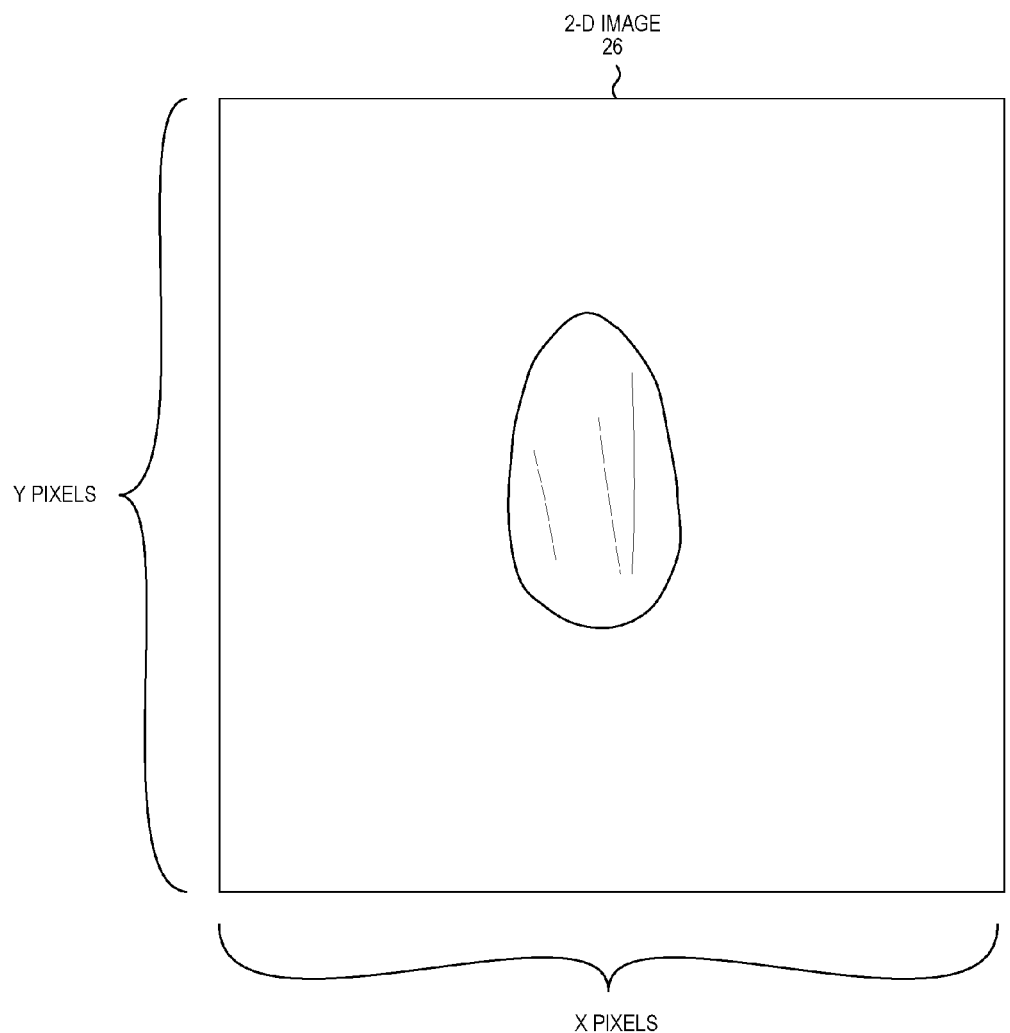
FIG. 8 is an image captured by a second camera of the double stereo camera system.
Figure 9:
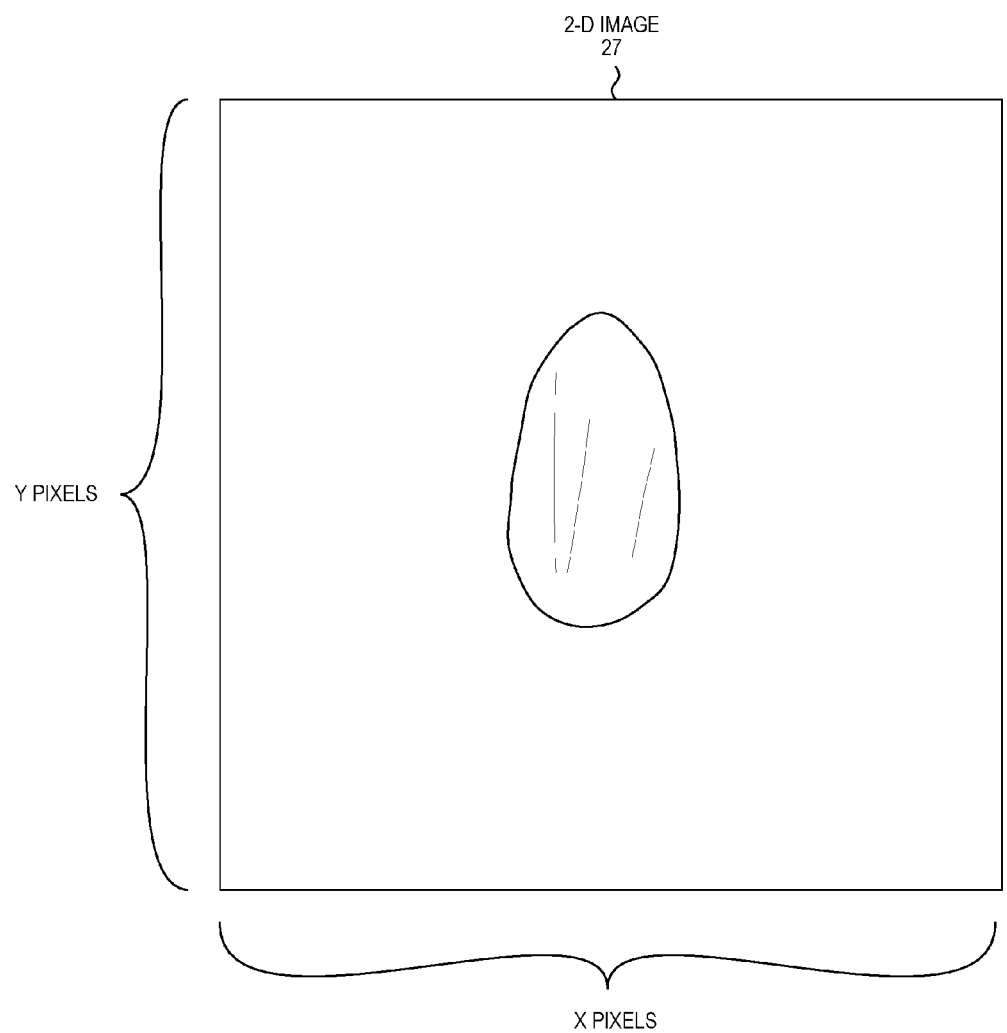
FIG. 9 is an image captured by a third camera of the double stereo camera system.
Figure 10:
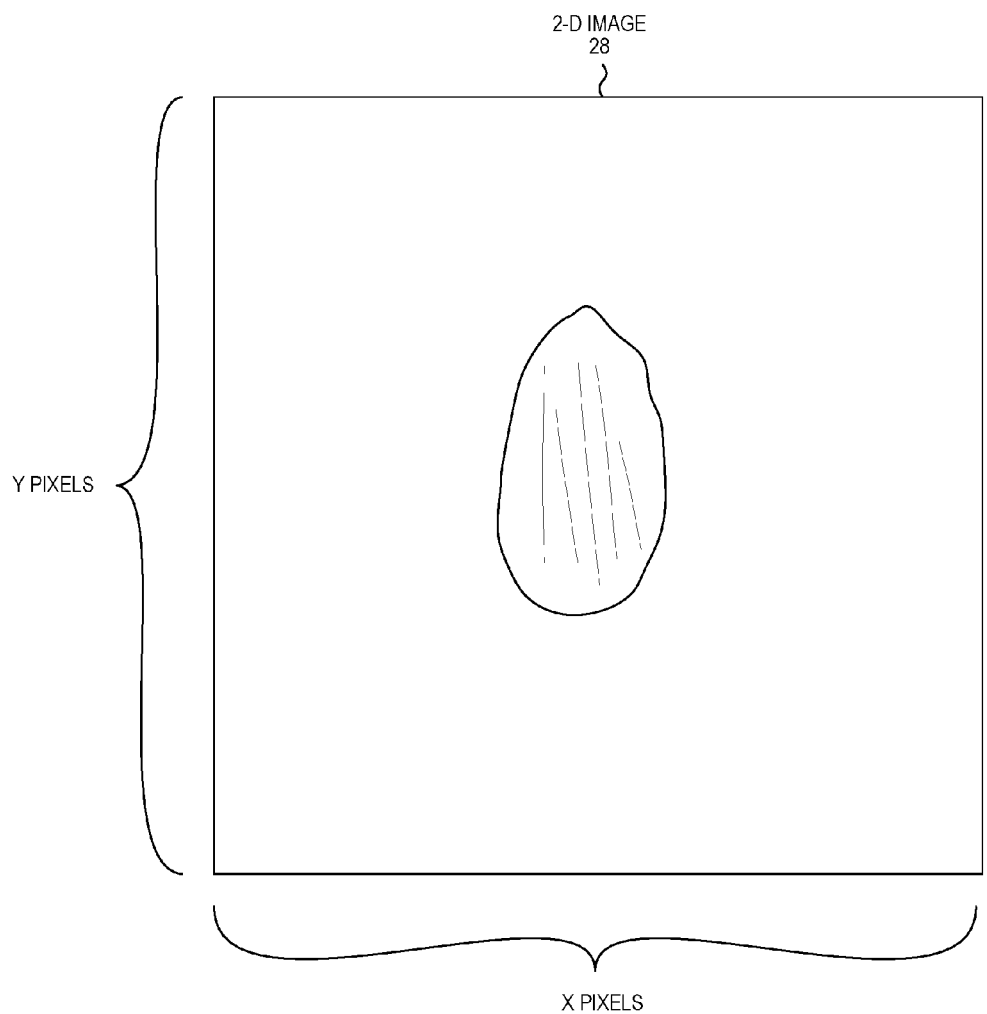
FIG. 10 is an image captured by a fourth camera of the double stereo camera system.

When the sample 17 travels through the focal plane, sample 17 is not contacting any surface. At this point in time, the light sources 8-9 and 15-16 are turned on and the first camera pair 18 and the second camera pair 19 capture at least one image of the sample. Each camera captures an image from a unique angle at the same moment in time as the sample travels through the focal plane. FIG. 7 is an image captured by a first camera of the double stereo camera system. FIG. 8 is an image captured by a second camera of the double stereo camera system. FIG. 9 is an image captured by a third camera of the double stereo camera system. FIG. 10 is an image captured by a fourth camera of the double stereo camera system. Each of these images is stored on a memory device located on the in-flight 3D inspector. On one example, the memory device is located within the computer system 12. It is noted that the captured images may only be temporarily stored on a memory device within the in-flight 3D inspector before being communicated across a network to another storage device located outside of the in-flight 3D inspector. For example, the captured images stored on a storage device within the computer system 12 may be communicated across RJ-45 connector 10 and a local network to another storage device not included in the in-flight 3D inspector. In this fashion, multiple images of the sample 17 are captured from four different angles at the same moment while the sample 17 is traveling through the focal plane while not in contact with any surface.

Capturing of images while the sample is not contacting any surface provides a great benefit. When the sample is not contacting any surface, images of each surface of the sample can be collected at the same moment in time. This is not possible in other image capturing systems. For example, when a sample is moved along a conveyer belt image of only one side of the sample may be captured at any one moment in time. View of the other side of the sample is blocked by the conveyer belt and therefore cannot be captured at the same moment in time. Capturing images of all surfaces of the sample at the same moment in time allows for generation of high quality 3D images of the sample. When images of various surfaces of the sample are taken at different moments in time, proper alignment of images is very difficult, requires additional processing and result in 3D images with lower quality due to introduced error.

The cameras communicate the captured images to the controller 31 or computer system 12 via bus. In one example, the bus is an Universal Serial Bus (USB). In another example, the bus is an IEEE 1394 "FireWire" bus.

In one example, the cameras are Charged Coupled Device (CCD) cameras. In another example, the cameras are Complementary Metal-Oxide Semiconductor (CMOS) cameras. In yet another example, the cameras are Indium Gallium Arsenide (InGaAs) cameras that are capable of measuring Short Wave Infra Red (SWIR) light.

Either line scan cameras and area scan cameras can be used to implement an in-flight 3D inspector. A line scan cameras contain a single row of pixels used to capture data very quickly. As the object moves past the camera, a complete image can be reconstructed in software line by line. Area scan cameras contain a matrix of pixels that capture an image of a given scene. They are more general purpose than line scan cameras, and offer easier setup and alignment.

It is noted herein that the light sources may each include a separate power source that drives the light when a control signal is received. Alternatively, each light source may be configured in an always on state where the power input terminal on each light source is coupled to an output terminal of a power supply where the output of the power supply is controlled by a control signal.

It is noted that the sample chute 13 is only one example how the sample can be directed to the focal plane. In a first alternative embodiment, the sample can be directed to the focal plane by use of a conveyer belt. In this first alternative embodiment, the sample would be directed from the sample input funnel to the conveyer belt, which in turn would propel the sample off the edge of the conveyer belt toward the focal plane. In a second alternative embodiment, the sample can be directed to the focal plane by use of an airburst. In this second alternative embodiment, the sample would be directed proximate to an airburst source, which in turn would propel the sample toward the focal plane. One example of an airburst source is a highly pressurized air tank connected to an electronically controlled valve, which outputs an airburst momentarily while the valve is open.

Sample Collection/Sorting

Once the sample 17 passes the focal plane, the sample 17 falls into collector bin 11. In one example, a collector bucket 20 is placed in collector bin 11. In this example, the sample 17 falls into the collector bucket 20. Additional samples placed into sample input funnel 4 make their way through the in-flight 3D inspector and eventually also fall into collector bucket 20. Once all samples have passed through the in-flight 3D inspector, a user can remove all samples by removing the collector bucket 20 from the collector bin 11.

In another example, a collector bucket 20 is not placed in collector bin 11. Rather, collector bin 11 is coupled to a sample sorting machine (not shown). In this example, the samples that pass through the in-flight 3D inspector are routed into different bins. The bin each sample is routed into is based on the images captured of the sample. In the event that the images of the sample indicate that the sample has a first type of defect, then the sample is routed to a first bin. In the event that the images of the sample indicate that the sample has a second type of defect, then the sample is routed into a second bin. Alternatively, in the event that the images of the sample indicate that the sample does not have any defects, then the sample is routed to a third bin. The sorting machine can route the samples using various different methods. A first method of routing includes using a burst of air to redirect the trajectory of a sample as it falls into the collector bin. A second method of routing includes using a mechanically controlled flap to redirect the trajectory of a sample as it falls into the collector bin.

3D Image Generation

Once the images are captured from each of the cameras, a 3D image of the sample can be created. In one example, the 3D image is generated by the computer system 12 included in the in-flight 3D inspector. In another example, the 3D image is generated by another computer system not included in the in-flight 3D inspector after the images are communicated across a network from the in-flight 3D inspector to the computer system not included in the in-flight 3D inspector.

The images captured by the first camera pair 18 are used to create a 3D image of a first side of the sample. The images captured by the second camera pair 19 are used to create a 3D image of the second side of the sample. In one example, data included in the captured 2D images are combined into a new dataset and missing information is added to complete the 3D information of the object: depth (distance). By using triangulation on matching pixels of the multiple 2D images captured by the in-flight 3D inspector, the depth component is derived and added to the dataset. This new dataset describes the object in 3D. This dataset is then used by advanced mathematical algorithms to describe the characteristics of the objects. The 3D images of the first and second sides of the sample are combined to create a 3D image of the entire sample. Once the 3D image of the entire sample is constructed, the 3D image can be analyzed to determine if various types of defects are present on the sample. For example, if the 3D image does not match a predetermined shape within a specified tolerance, then the sample is determined to be defective with respect to shape. In another example, if the 3D image shows a flat surface greater than a specified area, then the sample is determined to be defective with respect to surface contour.

Once the defect information is determined based on the 3D image of the sample, the defect information is stored with the 3D image. The defect information can be displayed on display 2 to a user of the in-flight 3D inspector. The defect information can also be used to generate a report indicating the number of defects detected across a multiple samples that have been inspected. The defect information for each sample can be used by a sorting machine attached to the collector bin 11 of the in-flight 3D inspector to determine how the sample is to be routed. The defect information for multiple samples can be used to generate a quality report indicating the quality grade of the multiple samples.

Various calibrations of the cameras may be performed. An internal calibration may be performed for each camera. Internal calibration includes calibration of principle points, focal lengths, pixel size ratios, and radial parameters. A stereo calibration may be performed as well. A stereo calibration addresses the external 3D rotation and translation between individual cameras of a stereo system. An inter-stereo calibration may also be performed to address the external 3D rotation and translation between the two stereo systems. In an inter-stereo calibration, a transformation is performed that stitches two different side reconstructions into one 3D model.

Capturing Images of Multiple Samples in a Single Image

The single sample chute 13 illustrated in FIG. 5 illustrates one embodiment of the present invention. In another embodiment (not shown in FIG. 5) the sample chute may be configured to direct multiple samples through the focal plane at the same moment in time. In this embodiment, the sample chute would cause multiple samples to fall through the focal plane along a single axis at the same time. Aligning the samples along a single axis prevents one sample from blocking a camera's view of another sample. The first and second camera pairs would then capture an image including multiple samples instead of just one. Said another way, a single image would include multiple samples instead of just one. Once the images of the multiple samples are captured, the computer system 12 would (i) determine which portions of each image are of each sample, and (ii) only use the portions of each image that are of the same sample to generate the 3D image of the sample.

This configuration would greatly accelerate the rate at which the in-flight 3D inspector can capture images of multiple samples. For example, if the sample chute directed ten samples through the focal plane as the same time instead of only one sample, then the in-flight 3D inspector would be able to collect images of samples ten times faster. Said another way, the in-flight 3D inspector would only require one-tenth the amount of time to collect images of a set of samples.

Figure 11:
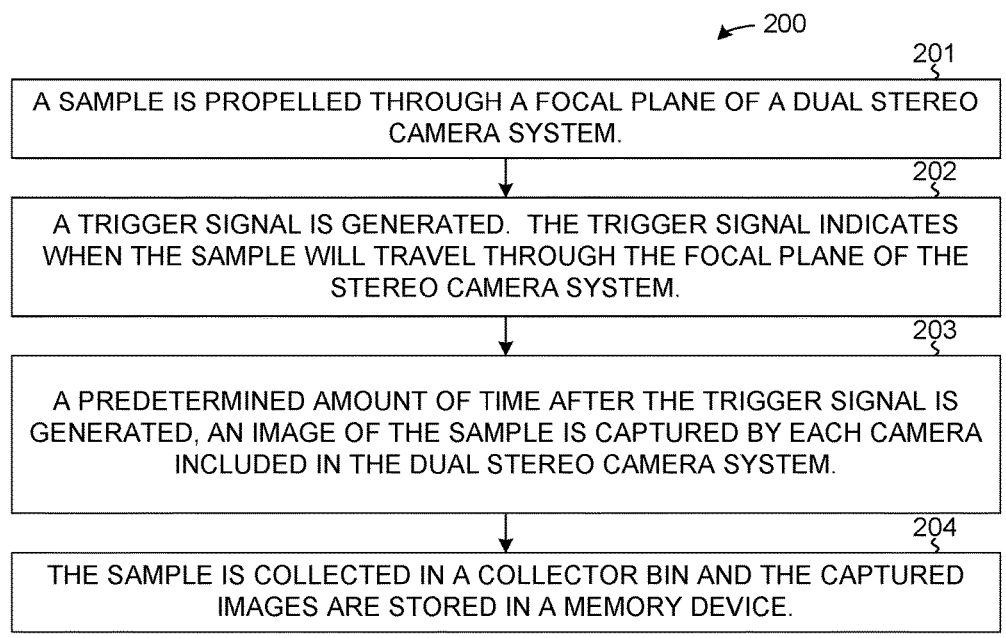
FIG. 11 is a flowchart of a in-flight 3D inspector.

FIG. 11 is a flowchart 200 of an in-flight 3D inspector. In step 201, a sample is propelled through a focal plane of a dual stereo camera system. In step 202, a trigger signal is generated. The trigger signal indicates when the sample will travel through the focal plane of the stereo camera system. In step 203, a predetermined amount of time after the trigger signal is generated, an image of the sample is captured by each camera included in the dual stereo camera system. The sample is illuminated by a light source while the image of the sample is captured. In step 204, the sample is collected in a collector bin and the captured images are stored in a memory device.

Figure 12:
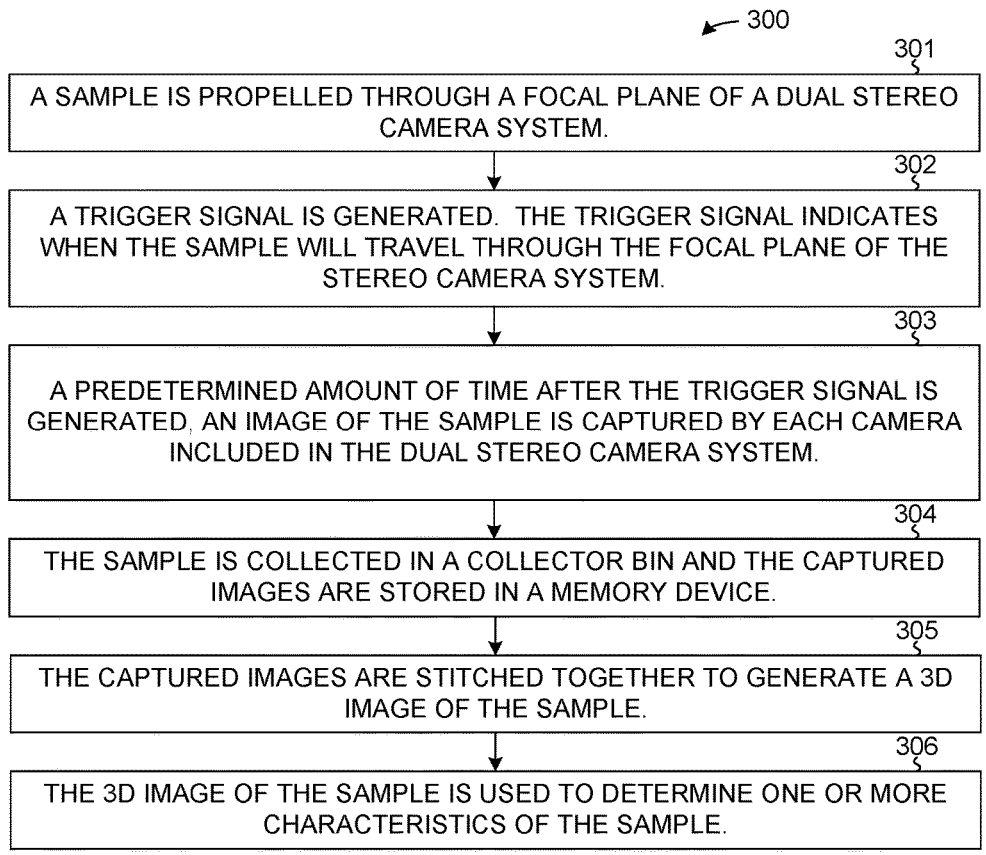
FIG. 12 is a flowchart of a in-flight 3D inspector with defect processing.

FIG. 12 is a flowchart 300 of an in-flight 3D inspector with defect processing. In step 301, a sample is propelled through a focal plane of a dual stereo camera system. In step 302, a trigger signal is generated. The trigger signal indicates when the sample will travel through the focal plane of the stereo camera system. In step 303, a predetermined amount of time after the trigger signal is generated, an image of the sample is captured by each camera included in the dual stereo camera system. The sample is illuminated by a light source while the image of the sample is captured. In step 304, the sample is collected in a collector bin and the captured images are stored in a memory device. In step 305, the captured images are stitched together to generate a 3D image of the sample. In step 306, the 3D image of the sample is used to determine one or more characteristics of the sample.

Various Numbers of Cameras can be Used

The two pairs of cameras 18-19 discussed above are used in a first embodiment of the present invention. In other embodiments, various other numbers of cameras may be used. For example, in another embodiment, the in-flight 3D inspector may include only one pair of stereo cameras that capture two images of the sample and the images are used to construct a 3D image of the sample from only one point of view. In another embodiment, three pairs of stereo cameras can be used to capture six images of the sample and the images are used to construct a 3D image of the sample from three points of view. After review of this disclosure, the reader will appreciate that additional cameras will provide additional accuracy of the 3D image created by the in-flight 3D inspector.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A device, comprising:
a first camera and a second camera, wherein the first and second cameras are each focused on a focal plane, wherein the first camera is adapted to capture an image in response to a trigger signal, and wherein the second camera is adapted to capture an image in response to the trigger signal;
a trigger adapted to detect a presence of a sample and in response generate the trigger signal;
a light source that is adapted to illuminate the sample when it travels through the focal plane, wherein the sample is not in contact with any surface while traveling through the focal plane;
a storage device adapted to store images captured by the first and second cameras;
a sample input funnel;
a sample chute, wherein the sample chute is adapted to receive the sample from the sample input funnel, wherein the sample chute is adapted to direct the sample toward a focal plane;
a collector bin adapted to receive the sample after the sample travels through the focal plane; and
a computer system adapted to generate a three dimensional image of the sample based on the images captured by the first and second cameras, wherein the images captured by the first and second cameras are captured while the sample is not in contact with any surface.

2. The device of claim 1, wherein the computer system is further adapted to control the first and second cameras, wherein the computer system is configured to receive the trigger signal and in response cause the first and second cameras to capture an image.

3. The device of claim 1, further comprising:
a controller adapted to control the first and second cameras, wherein the controller is configured to receive the trigger signal and in response cause the first and second cameras to capture an image.

4. The device of claim 1, wherein the light source is coupled to a power supply circuit via a controller, and wherein the controller controls application of power to the light source.

5. The device of claim 1, wherein the device is adapted to capture the images of the sample when the sample is not contacting any surface.

6. The device of claim 1, wherein the sample chute is adapted to propel the sample by gravity.

7. The device of claim 1, wherein the sample chute is adapted such that more than one sample passes through the focal plane at a moment in time, and wherein the sample chute is adapted such that the more than one sample passes through the focal plane along a single axis.

8. The device of claim 1, wherein the collector bin is configured to hold a collector bucket, and wherein the sample enters the collector bucket after passing through the focal plane.

9. A device, comprising:
a first camera and a second camera, wherein the first and second cameras are each focused on a focal plane, wherein the first camera is adapted to capture an image in response to a trigger signal, and wherein the second camera is adapted to capture an image in response to the trigger signal;
a trigger adapted to detect a presence of a sample and in response generate the trigger signal;
a light source that is adapted to illuminate the sample when it travels through the focal plane, wherein the sample is not in contact with any surface while traveling through the focal plane;
a storage device adapted to store images captured by the first and second cameras, wherein a conveyor belt is adapted to direct the sample toward the focal plane.

10. A device, comprising:
a first camera and a second camera, wherein the first and second cameras are each focused on a focal plane, wherein the first camera is adapted to capture an image in response to a trigger signal, and wherein the second camera is adapted to capture an image in response to the trigger signal;
a trigger adapted to detect a presence of a sample and in response generate the trigger signal;
a light source that is adapted to illuminate the sample when it travels through the focal plane, wherein the sample is not in contact with any surface while traveling through the focal plane;
a storage device adapted to store images captured by the first and second cameras;
a sample input funnel;
a sample chute, wherein the sample input funnel is adapted to direct the sample to the sample chute, and wherein the sample chute is adapted to direct the sample toward the focal plane; and
a collector bin adapted to receive the sample after the sample travels through the focal plane, wherein the sample chute is configured such that at least one sample passes through the focal plane at a moment in time.

11. A device, comprising:
a first camera and a second camera, wherein the first and second cameras are each focused on a focal plane, wherein the first camera is adapted to capture an image in response to a trigger signal, and wherein the second camera is adapted to capture an image in response to the trigger signal;
a trigger adapted to detect a presence of a sample and in response generate the trigger signal;
a light source that is adapted to illuminate the sample when it travels through the focal plane, wherein the sample is not in contact with any surface while traveling through the focal plane;
a storage device adapted to store images captured by the first and second cameras, wherein the trigger is an optical trigger that includes a transmit Light Emitting Diode (LED) and a receive Light Emitting Diode (LED), and wherein the optical trigger is adapted such that the line of sight between the transmit LED and the receive LED is broken by the sample before the sample passes through the focal plane.

12. A device, comprising:
a first camera and a second camera, wherein the first and second cameras are each focused on a focal plane, wherein the first camera is adapted to capture a first image, and wherein the second camera is adapted to capture a second image;
a trigger that outputs a signal that causes the first and second image to be captured;
a light source that is adapted to illuminate the sample when it travels through the focal plane, wherein the sample is not in contact with any surface while traveling through the focal plane;
a storage device adapted to store the first image captured by the first camera and the second image captured by the second camera,
wherein the sample is selected from the group consisting of: a tree nut, a peanut, a tablet, a screw, and a washer.

13. The device of claim 12, wherein an airburst is adapted to direct the sample toward the focal plane.

14. A device, comprising:
a first camera and a second camera, wherein the first and second cameras are each focused on a focal plane, wherein the first camera is adapted to capture an image in response to a trigger signal, and wherein the second camera is adapted to capture an image in response to the trigger signal;
a trigger adapted to detect a presence of a sample and in response generate the trigger signal;
a light source that is adapted to illuminate the sample when it travels through the focal plane, wherein the sample is not in contact with any surface while traveling through the focal plane; and
a storage device adapted to store images captured by the first and second cameras, wherein the first camera includes a first shutter and the second camera includes a second shutter, wherein the light source is adapted to turn on after the first and second shutters are opened, and wherein the light source is adapted to turn off before the first and second shutters are closed.

15. A method, comprising:
(a) propelling a sample toward a focal plane; (b) determining when the sample will travel through the focal plane; (c) illuminating the sample as it travels through the focal plane using at least one light source; (d) capturing two or more images of the sample using at least two cameras while the sample is traveling through the focal plane, wherein each image is captured from a different angle, and wherein the sample is not in contact with any surface as the sample travels through the focal plane; and (e) storing the two or more images in a storage device, wherein the sample is selected from the group consisting of: a tree nut, a peanut, a tablet, a screw, and a washer.

16. The method of claim 15, further comprising:
(f) generating a three dimensional image of the sample based on the two or more captured images; and
(g) determining one or more characteristics of the sample based on the three dimensional image.

17. The method of claim 16, wherein (a) is performed by a sample chute, and wherein (e) through (g) are performed by a computer system that includes a storage device.

18. The method of claim 15, wherein each of the two cameras are focused on the focal plane, and wherein (b) is performed in part by a trigger that outputs a trigger signal when the presence of a sample is detected.

19. A device, comprising:
a light source that is adapted turn on the light source in response to receiving a trigger signal;
a first camera and a second camera, wherein the first and second cameras are each focused on a focal plane, wherein the first camera is adapted to capture an image in response to the trigger signal, and wherein the second camera is adapted to capture an image in response to the trigger signal;
a storage device adapted to store images captured by the first and second cameras; and
a first means for detecting the presence of a sample and in response generating the trigger signal;
a second means for generating a three-dimensional image based on images captured by the first and second cameras; and
a third means for detecting a defect of the sample based on the three-dimensional image, wherein the sample is selected from the group consisting of: a tree nut, a peanut, a tablet, a screw, and a washer.

20. The device of claim 19, wherein the first means includes a trigger, wherein the second means includes a computer system that combines the images captured by the first and second cameras to generate the three-dimensional image, and wherein the third means is the computer system that analyzes the three-dimensional image for defects.

* * * * *